March 15, 1938.  A. MADLÉ  2,111,149
POWER TRANSMISSION MECHANISM
Filed May 5, 1933
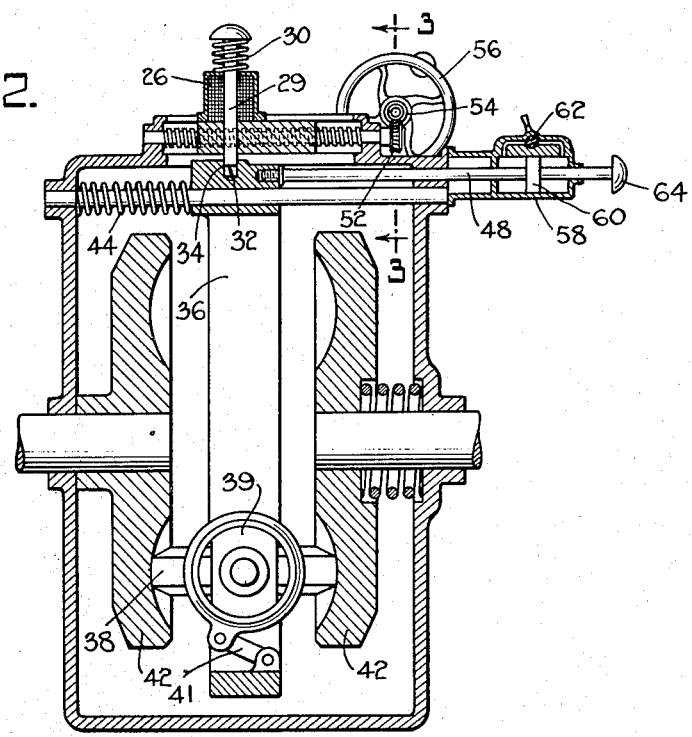
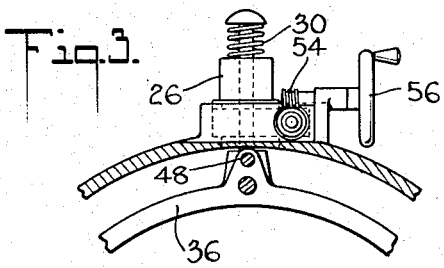
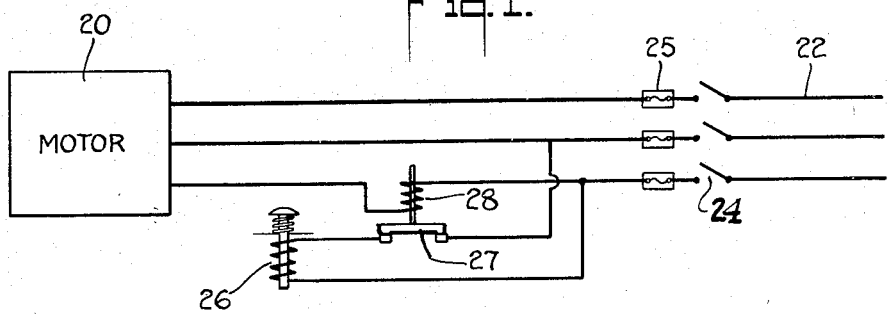
INVENTOR
Alain Madlé
BY
ATTORNEY Patented Mar. 15, 1938

2,111,149

UNITED STATES PATENT OFFICE 2,111,149

POWER TRANSMISSION MECHANISM

Alain Madlé, Bristol, Conn., assignor to Erban Operating Corporation, New York, N. Y., a corporation of New York Application May 5, 1933, Serial No. 669,534

31 Claims. (Cl. 172—239)

This invention relates to variable speed power transmission mechanisms and particularly to automatically operative means for causing such mechanism to assume a predetermined ratio setting upon predetermined changes in the operating conditions affecting the prime mover.

For purposes of convenience of reference the prime mover will hereinafter be referred to as the motor and in the embodiment herein illustrated this has been disclosed as electrically energized. My invention has therefore been illustrated as particularly arranged for functioning in connection with electricity as the source of energy, although it will be understood that as to the broader phases thereof, my invention can be embodied in an arrangement peculiarly adapted for sources of power other than electricity.

The stoppage of a motor, transmitting through a variable speed power transmission while in high speed ratio, leaves the transmission in a ratio setting which will place maximum load upon the motor when it is restarted, and in fact, will make it impossible to restart the motor, where, for example, the motor stopped because of an overload. It is to be understood that by the term "high speed ratio" as used hereinafter, I mean a transmission ratio in which the speed of the driven member as compared to that of the driving member or motor is relatively high, so that the torque to be overcome by the motor is relatively high. And further by the term "low speed ratio" or "low ratio" I mean a transmission ratio in which the speed of the driven member as compared to that of the driving member is relatively low, so that the torque to be overcome by the motor is relatively low.

One of the objects of my invention involves the association with a variable speed power transmission mechanism, of means automatically operative, when the motor ceases operating, to establish the transmission in a position of low ratio. In the embodiment herein disclosed, where the motor is electrically driven, the automatically operative means are shown, for purposes of illustration, as being in the form of an arrangement responsive to such drops in current and voltage, as to have the voltage insufficient to properly energize the motor, although the broader phases of my invention may be attained where such means are responsive to a factor other than drop in voltage.

My invention has been illustrated in connection with a power transmission mechanism of the adhesive type which is continuously variable and in which the variations while controllable independently of the power transmitted by the motor, are effected by the motive power. In such a transmission, as a practical matter, the transmission ratio, can be changed only while the parts of the transmission are in motion. Therefore, unless the ratio is low at the time of the stoppage of the motor, the restarting of the motor must be effected under the high load conditions of maximum speed which is apt to be impossible.

It is therefore a further object of my invention to provide an arrangement which becomes automatically operative immediately upon the ceasing of the flow of energy to the motor, as for example, the shutting off of the electric current and while the motor is still operating under momentum, to effect a change in the ratio of transmission to low ratio.

Similar problems to those referred to exist where overload conditions occur while the ratio is above the minimum, and my invention also contemplates as one of its features the provision of an arrangement for automatically reducing the ratio where such conditions occur. In the illustrated embodiment, where the motor is energized by electricity, and therefore the overload conditions result in an abnormal increase of current the functioning of my arrangement is disclosed as dependent upon or responsive to such abnormal flow of electrical energy, and in the detailed construction, this is so associated with the underload mechanism already discussed as to control the operation of that mechanism just as if the current had been cut off.

The following conditions resulting from overloads are frequently met with: (1) a fuse blows as the result of an overload, (2) the motor stalls. If the adjusting mechanism is responsive quickly enough, it will function to reduce the speed ratio before either of these occurrences take place. The mechanism should therefore be so designed in relation to the speed of action of the protective devices, such as fuses, and the rapidity of slowing down of the motor, as to avoid either of the above-mentioned occurrences.

My invention is herein disclosed as embodied in a device in which (a) the motive power is electricity (b) the transmission is of the adhesive continuously variable type comprising races and rollers and (c) the rollers are free to be angled about an axis diametrically through the points of adhesive contact of the races and the rollers, and (d) the rotation of the races causes the rollers when angled to tilt continuously to cause a continuous ratio change.

The invention as to one of its phases, takes the form of an arrangement which is responsive to a voltage drop sufficient to cause the motor to cease operating, and to automatically cause the aforementioned angling of the rollers in such direction that upon the continued operation of the races under momentum the roller shifting will be effected to tilt the rollers to a position of minimum ratio of transmission.

As to another of its phases the invention takes the form of a similar arrangement, operative, however, only where the electric current input into the motor is excessively high.

It will be understood, of course, that a single arrangement can serve both phases and I have so illustrated my invention.

The arrangement herein illustrated and disclosed is subject to variations without departing from the spirit of my invention. For example, the manner of energizing the motor will vary the arrangement. So too the functioning of the arrangement need not be dependent upon abnormal conditions of power flow.

For the attainment of the aforementioned objects and of such other objects as will hereinafter appear or be pointed out, I have illustrated one embodiment of my invention in the drawing in which:

Figure 1 is a diagrammatic view of my invention showing an illustrative lay-out of the electric circuits;

Figure 2 is a sectional view through a transmission mechanism showing associated therewith certain details of my invention; and Figure 3 is a section on line 3—3 of Figure 2, looking in the direction of the arrows.

Before proceeding to describe the details which may be associated with the practical embodiments of my invention, I will proceed to describe its general features and general operation as applied to an electric motor.

On viewing Figure 1 of the drawing it will be observed that I have shown an electric motor 20 which is energized from the power line 22. A switch 24 is interposed between the line and the motor, as are also protective devices such as delayed action, overload relays 25, which may be fuses. The power line has been shown as supplying three-phase alternating current, by way of example, but it will be obvious from the description which follows that my invention is equally applicable to other types of electric power. Across two of the conductors of the power line is shunted a solenoid 26, and in series with one of the conductors of the power line is a solenoid 28, which is part of a circuit-breaking device of the quick-break overload type and acts to open the circuit of solenoid 26 by means of switch 27, when it becomes active due to an overload in the conductor.

Solenoid 26 has associated with it a plunger or other moving part which, when the solenoid is de-energized sufficiently will be caused, by the action of some means such as a spring, to release mechanism which will be effective to set the speed ratio of the transmission in a desired manner. De-energization of solenoid 26, total or partial, may take place as a result of opening of the switch 24, of operation of the overload relays 25, of the burning out or short circuiting of part of the electric circuit, or of other causes which it is believed unnecessary to enumerate.

If the load on the motor increases so that the current passing into the same exceeds a certain predetermined amount, the solenoid 28 will be energized so as to open the switch 27 associated with it. The effect of this also will be to break the circuit of solenoid 26 and to de-energize the same.

It is next proposed to describe the application of my invention in connection with a power transmission mechanism of a type for providing speeds continuously variable within certain limits and in which a system of rotating races is provided, which have rolling bodies between them, and in adhesive contact with them, to transmit motion from the driving race or races to the driven race or races. Speed variation is effected by tilting the axes of the rolling bodies so as to change their points of contact with the races and thereby to vary the relative rotational speeds of the driving and driven races. It is a characteristic of such systems that in order to effect ready tilting of the rollers for purpose of speed variation the parts must be moving and it is therefore important that any setting of the speed ratio be effected while the parts are still moving, and before they have come to a stop due to the stoppage of the motor. In effecting the tilting of the rollers, it is further customary in modern practice to make use of the principles of gyrostatic precession, according to which pressure is applied against the axis of tilting of the roller in a direction at right angles to the direction in which it is desired to tilt the roller. This principle is well understood and a system of variable speed power transmissions of the type to which I have reference will be found disclosed in the patent to Erban, No. 1,619,813 of March 8, 1927. The tilting of the rollers to cause speed variation is customarily effected by a moving member which, by a system of links, racks or similar devices, causes the tilting of the roller axes. For the sake of simplicity, I have illustrated a simple form of roller tilting device, in which the principle of gyrostatic precession is not used since the latter construction introduces complexities into which it is unnecessary to go in order to get a proper understanding of my device.

With the aid of this preliminary explanation, the construction and operation of an illustrative embodiment of my invention as applied to this type of variable speed transmission will be readily understood on reference to Figures 2 and 3. In said figures 26 indicates the solenoid already mentioned in connection with Figure 1. The solenoid 26 has associated with it an armature or plunger 29 carrying a pin 32 which plunger and pin are urged upward by a spring 30, but when the solenoid is energized, will be pulled downward by magnetic action to engage with an opening 34 provided in a member 36, by means of which the angular relation of rollers 38 to races 42 may be controlled for the purpose of effecting a change in the speed ratio of the transmission. Such control of the angular relation of the rollers is effected through member 36 by means of elements 41 which impart motion of 36 to carriages 39 within which rollers 38 are journalled. The details of such a construction are not necessary to an understanding of my invention as they are well known. However, reference may be made to the Erban patent hereinbefore mentioned as using the gyrostatic principle or to the patent to Spencer, No. 682,763 of September 17, 1901 showing an older and simpler construction. Member 36 is pushed in a direction effective to reduce the ratio of speed transmission, by a compression spring 44. This action of the spring, however, cannot take place as long as the pin 32 engages the opening 34 in the member 36, because the pin and the solenoid with which it is associated are held against movement by the shifting carriage 50 with which they are fixedly associated, which carriage is adjustably held in position by a shifting screw 52 actuated through suitable gearing 54 by a wheel 56, which is shown as a hand wheel, but may, of course, be operated by motive power where desired or necessary, as where great power is required for the adjustment, or where the control station is remote. It will be obvious that while the carriage 50 may be shifted by the hand wheel 56, it will be impossible if the screw 52 is suitably pitched, for the springs 44 to move the carriage and gearing 54 may also be made irreversible for this purpose. It will, of course, be understood that the transmission may be enclosed in a suitable housing which it is not necessary to describe, and that for the purpose of simplicity and compactness all the parts described may be associated with such housing in any convenient way.

In connection with the general description of the parts just given, it will be understood that normally, when the motor is running, the solenoid 26 will have sufficient current passing through it to keep the pin 32 in engagement with the opening 34 in member 36, which will be held in a certain position, which position, however, may be altered at any time, as desired, by adjustment through the wheel 56. If for any reason, the voltage, and consequently the current, of solenoid 26 drops below a predetermined point, the spring 30 will move the pin 32 upward and out of the opening 34, thereby releasing the roller shifting member 36 and permitting the spring 44 to move member 36 into a position in which it will cause the rollers of the transmission to tilt so as to reduce the transmission ratio. When this has taken place, if the motor is again started, it will do so under the most favorable load conditions, which are those of low speed transmission and therefore of light starting load. Once the parts are again running, a resetting rod 48 connected to member 36 may be used to push the said member against the action of spring 44 into a position in which it will be again engaged by pin 32 passing into aperture 34 and be again subject to control by wheel 56. It is to be noted that when the motor is restarted, the ratio setting will be that due to the automatic action, and because of the difficulty or impossibility of adjusting the ratio when the transmission is at rest, the new adjustment cannot be given to the speed ratio until after the motor has again been started.

If the mechanism driven through the transmission consists of parts possessing great inertia, such as heavy fly-wheels or the like, it may happen, unless the transmission is carefully designed, that in attempting to reduce the transmission ratio, the heavy parts will only gradually acquire a reduced speed, and for a time may act through the transmission to speed up the motor, which is obviously undesirable. For that reason it is desirable to delay the action of the spring 44. A convenient arrangement for accomplishing this has been shown in Figure 2 in the form of a dash-pot 58 of any suitable type, the piston 60 of which is fixedly associated with the aforementioned push-rod 48, and the speed of action of which is controllable by the adjustable valve 62.

Push-rod 48 may be provided with a push-button head 64, by means of which it may be conveniently pushed inward after it has been pushed outward as a result of the automatic ratio setting action.

Having thus described my invention and illustrated its use, what I claim as new and desire to secure by Letters Patent is:

1. In a system of power transmission in which motive power is transmitted from a prime mover to a load at variable speed, means for automatically decreasing the speed ratio of the transmission and means in the path of power input into the prime mover for causing said automatic means to become operative under predetermined conditions of power input into the prime mover, and means drawing power from the power source along a path parallel to the path of power into the prime mover, for causing said automatic means to become operative under predetermined conditions of power input into the prime mover.

2. In a system of power transmission in which motive power is transmitted from a motor to a load at variable speed, means for automatically decreasing the speed ratio of the transmission, means for causing said automatic means to become operative under predetermined conditions of power input into the motor, and an element in the path of the power input into the motor responsive to predetermined conditions of power flow into the motor for causing said second means to become operative and thereby to cause said automatic means to become operative.

3. In a system of power transmission in which motive power is transmitted from a prime mover to a load at a variable speed, means for automatically decreasing the speed ratio of the transmission, and means to render said automatic speed varying means operative when the power input into the prime mover exceeds a predetermined maximum or falls below a predetermined minimum.

4. In a system of power transmission in which motive power is transmitted from an electric motor to a load at a variable speed, means for automatically decreasing the speed ratio of the transmission, and means to render said automatic speed varying means operative when the power input into the motor exceeds a predetermined maximum or falls below a predetermined minimum, said means comprising a coil shunted across the electric power line serving the motor, and a second coil in the power line in series with the motor and having means associated therewith for interrupting the current in said first coil.

5. In a system of power transmission in which motive power is transmitted from an electric motor to a load at a variable speed, means for automatically decreasing the speed ratio of the transmission, and means to render said automatic speed varying means operative when the power input into the motor exceeds a predetermined maximum or falls below a predetermined minimum, said means comprising a coil shunted across the power line serving the motor, and a second coil in the power line in series with the motor and adapted to control the current in the first coil.

6. In a system of power transmission in which motive power is transmitted from a motor to a load at a variable speed, means for automatically decreasing the speed ratio of the transmission, and means to render said automatic speed varying means operative when the power input into the motor exceeds a predetermined maximum or falls below a predetermined minimum, said means comprising an element responsive to a decrease of the power input below said minimum, and an element responsive to an increase of the power input above said maximum to cause operation of said first element.

7. In a power transmission mechanism in which motive power is transmitted from a motor to the load at a torque ratio capable of variation, means for varying said torque ratio, and means rendered operative by reduction of the power input into the motor below a predetermined amount for varying said torque ratio so as to reduce the torque required of the motor, manually operable means to restore said torque ratio to normal, and means to lock said manually operable means to said means for varying the torque ratio.

8. In a variable speed power transmission system adapted to be interposed between a prime mover and a load, means for automatically setting the speed ratio of the transmission to its minimum speed ratio position, locking means for preventing operation of said first means, and means responsive to predetermined conditions of the power input into the prime mover to release said locking means and render effective said means for automatically setting the speed ratio.

9. In a variable speed power transmission system for transmitting power from a prime mover to a load, means for automatically setting the speed ratio of the transmission to its minimum speed ratio position, manual control means for manual control of the speed ratio, locking means for preventing operation of said first means and for enabling operation of said manual control means and means responsive to predetermined conditions of the power input into the prime mover to release said locking means and render effective said means for automatically setting the speed ratio.

10. In combination with a prime mover actuated by the flow thereinto of power from an external source of power, and a load driven by said prime mover, and variable speed power transmission mechanism intermediate said prime mover and said load, means adapted, when the pressure causing the flow of power into the prime mover, drops below a predetermined minimum, to lower the speed ratio of said power transmission mechanism.

11. In combination with a prime mover actuated by the flow thereinto of power from an external source of power, a load driven by said prime mover, and variable speed power transmission mechanism intermediate said prime mover and said load, and means adapted, when the pressure causing the flow of power into the prime mover drops below a predetermined minimum, or when the flow of power into the prime mover exceeds a predetermined maximum, to lower the speed ratio of said power transmission mechanism.

12. In combination with a prime mover actuated by the flow thereinto of power from an external source of power, and a load driven by said prime mover, and variable speed power transmission mechanism intermediate said prime mover and said load, means adapted, when the pressure causing the flow of power into the prime mover, drops below a predetermined minimum, to lower the speed ratio of said power transmission mechanism to its minimum value.

13. In combination with a prime mover actuated by the flow thereinto of power from an external source of power, a load driven by said prime mover, and variable speed power transmission mechanism intermediate said prime mover and said load, and means adapted, when the pressure causing the flow of power into the prime mover drops below a predetermined minimum, or when the flow of power into the prime mover exceeds a predetermined maximum, to lower the speed ratio of said power transmission mechanism to its minimum value.

14. In combination with an electric motor, a load driven thereby, and a variable speed power transmission mechanism intermediate the motor and the load, and means adapted, when the voltage causing current flow into the motor drops below a predetermined minimum, to lower the speed ratio of said power-transmission mechanism.

15. In combination with an electric motor, a load driven thereby, and a variable speed power transmission mechanism intermediate the motor and the load, and means adapted, when the current flow into the motor exceeds a predetermined maximum, or when the voltage causing said current flow drops below a predetermined minimum, to lower the speed ratio of said power transmission mechanism.

16. In combination with an electric motor, a load driven thereby and a variable speed power transmission mechanism intermediate the motor and the load, and means adapted, when the voltage causing current flow into the motor drops below a predetermined minimum, to lower the speed ratio of said power transmission mechanism to its minimum value.

17. In combination with an electric motor, a load driven thereby, and a variable speed power transmission mechanism intermediate the motor and the load, means for adjusting said transmission mechanism to vary the speed ratio of the transmission mechanism and means independent of said adjusting means adapted to become operative when the flow of current into the motor exceeds a predetermined maximum, to lower the speed ratio of said power transmission mechanism to its minimum value.

18. In combination with an electric motor, a load driven thereby, and a variable speed power transmission mechanism intermediate the motor and the load, and means adapted, when the current flow into the motor exceeds a predetermined maximum, or when the voltage causing said current flow drops below a predetermined minimum, to lower the speed ratio of said power transmission mechanism to its minimum value.

19. In a power transmission system in which the ratio of transmission between the motor and the load is variable, means for causing the ratio to assume its lowest value, manually adjustable means adapted to be interlocked with said first means so as to prevent its functioning when so interlocked and to permit manual adjustment of said ratio, interlocking means for effecting said interlocking, and resetting means adapted to effect the interlocking after its interruption.

20. In a power transmission system in which the ratio of transmission between the motor and the load is variable, means for causing the ratio to assume its lowest value, manually adjustable means adapted to be interlocked with said first means so as to prevent its functioning when so interlocked and to permit manual adjustment of said ratio, interlocking means for effecting said interlocking, and resetting means whereby the interlocking may again be effected when it is interrupted, and said interlocking means being movable in response to predetermined conditions in the power line whereby power flows into the motor, so as to break the interlock.

21. In combination with an electric motor, a load driven thereby, and a variable speed power transmission mechanism intermediate the motor and the load, a first means normally adapted to lower the speed ratio to its minimum value, a second means to prevent the action of said first means, and a third means, effective when the inflow of current into the motor exceeds a predetermined maximum, to render said second means ineffective, and thereby to cause said first means to lower the speed ratio to its minimum value.

22. In combination with an electric motor, a load driven thereby, and a variable speed power transmission mechanism intermediate the motor and the load, a first means normally adapted to lower the speed ratio to its minimum value, a second means to prevent the action of said first means, and a third means, effective when the inflow of current into the motor drops below a predetermined minimum, to render said second means ineffective, and thereby to cause said first means to lower the speed ratio to its minimum value.

23. Control mechanism for a ratio changing transmission, said mechanism comprising yielding means to bias said transmission toward its low ratio position, electrically responsive means to render said yielding means inoperative, and manually operable means to vary the ratio of said transmission.

24. Control mechanism for a ratio changing transmission, said mechanism comprising yielding means to bias said transmission toward its low ratio position, electrically responsive means to render said yielding means inoperative, and manually operable means to vary the ratio of said transmission, together with resetting means reciprocated by said yielding means in one direction and manually reciprocable in the other direction to reset said transmission, and render said electrically responsive means operable.

25. A ratio changing transmission comprising manually operable means to vary the ratio of said transmission, and a control mechanism therefor comprising yielding means to bias said transmission toward its low ratio position and electrically responsive means to render said yielding means inoperative.

26. A ratio changing transmission comprising manually operable means to vary the ratio of said transmission and a control mechanism therefor comprising yielding means to bias said transmission toward its low ratio position and electrically responsive means to render said yielding means inoperative, together with resetting means reciprocated by said yielding means in one direction and manually reciprocable in the other direction to reset said transmission and render said electrically responsive means operable.

27. A ratio changing transmission comprising manually operable means to vary the ratio of said transmission and a control mechanism therefor comprising yielding means to bias said transmission toward its low ratio position and electrically responsive means to render said yielding means inoperative, together with resetting means reciprocated by said yielding means in one direction and manually reciprocable in the other direction to reset said transmission.

28. A ratio changing transmission comprising manually operable means to vary the ratio of said transmission and a control mechanism therefor comprising yielding means to bias said transmission toward its low ratio position and electrically responsive means to render said yielding means inoperative, together with resetting means reciprocated by said yielding means in one direction and manually reciprocable in the other direction to restore said transmission to its original ratio position.

29. A ratio changing transmission comprising manually operable means to vary the ratio of said transmission a control mechanism therefor comprising yielding means to bias said transmission toward its low ratio position and electrically responsive means to render said yielding means inoperative, and means for controlling the speed of ratio change effected by the operation of the yielding means.

30. A ratio changing transmission comprising manually operable means to vary the ratio of said transmission and a control mechanism comprising yielding means to bias said transmission toward its low ratio position and electrically responsive means to render said yielding means inoperative, together with resetting means reciprocated by said yielding means in one direction, manually reciprocable in the other direction to restore said transmission to its original ratio position and means for controlling the speed of operation of the restoring means.

31. In combination with a prime mover actuated by the flow thereinto of power from an external source of power, a load driven by said prime mover, and variable speed power transmission mechanism intermediate said prime mover and said load, and means adapted, when the flow of power into the prime mover exceeds a predetermined maximum, to lower the speed ratio of said power transmission mechanism.

ALAIN MADLÉ.